Dec. 11, 1962  A. I. McFARLAN  3,067,587
AIR CONDITIONING SYSTEM
Filed May 4, 1960  2 Sheets-Sheet 1

INVENTOR.
ALDEN I. McFARLAN
BY
Curtis, Morris & Safford
ATTORNEYS

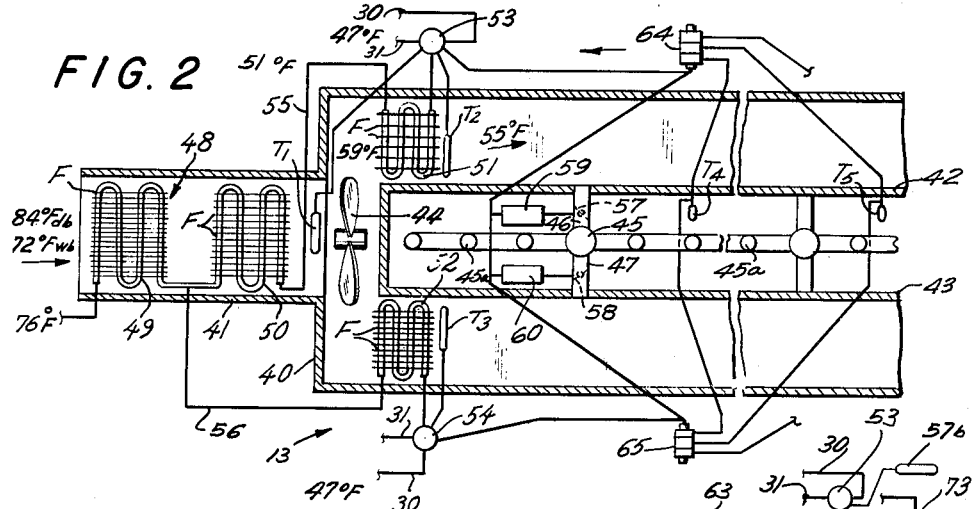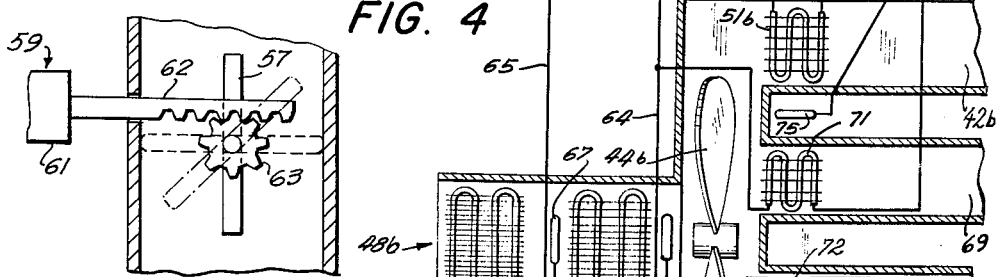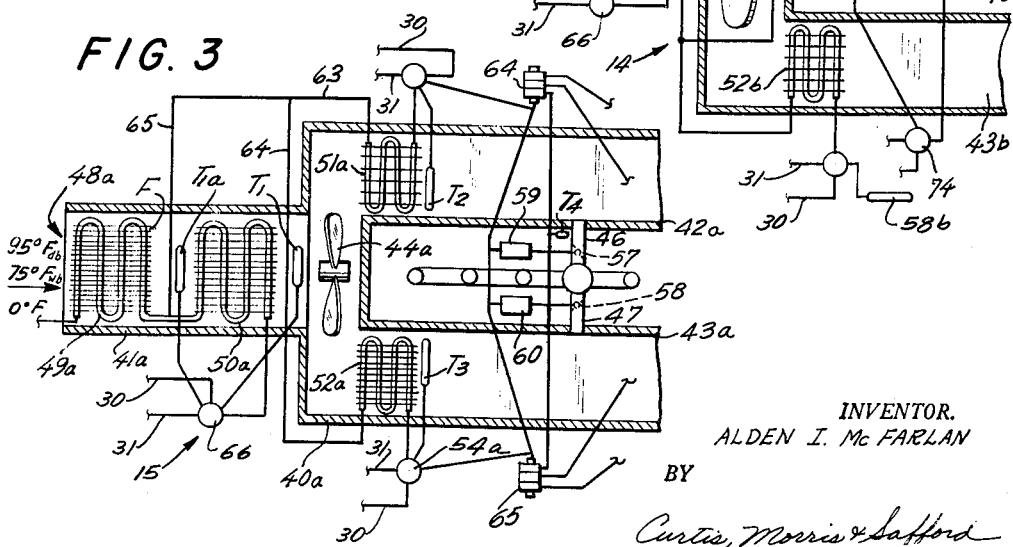

United States Patent Office
3,067,587
Patented Dec. 11, 1962

3,067,587
AIR CONDITIONING SYSTEM
Alden Irving McFarlan, 691 Dorian Road, Westfield, N.J.
Filed May 4, 1960, Ser. No. 26,776
17 Claims. (Cl. 62—159)

The present invention relates to air conditioning and more particularly to air conditioning systems for both heating and cooling an enclosure.

Many modern buildings have separate areas with different air conditioning requirements. For example, the interior areas of the building may require cooling the year around while the outside areas may require cooling in summer and heating in winter. Furthermore, due to lighting, appliances, and heat producing machines and facilities, the total heating load may closely approach the cooling load during many months of the year. For example, the internal area of the building may be used for interior office areas, restaurants, kitchens, utility rooms or auditoriums which together with the lighting and appliance loads may require cooling the year around with the cooling loads in different sections of the area differing from each other and varying at different times during a day. Also, some of the outside areas may require heating while others require cooling during certain seasons of the year, such as during the spring and fall, and the heating and cooling requirements may change during the day. As an illustration, the east side of the building may require cooling during the morning and heating during the afternoon while the west side of the building may require heating during the morning and cooling during the afternoon.

Furthermore, the kind of cooling required will change with different seasons and particular days during a season. On extremely hot days much of the refrigeration capacity may be used for sensible heat cooling (without removing moisture) to reduce the temperature of the air. On extremely humid days, and especially those below peak dry bulb temperatures, the principal load will be latent heat cooling (removing moisture to reduce humidity) with a little or no sensible heat cooling which under certain conditions requires reheating of the cooled dehumidified air for adequate temperature and humidity control. Between these two extremes the cooling load will be divided between sensible and latent heat cooling to dehumidify as well as cool the air.

When the refrigeration load is all sensible heat with no latent heat removal it is desirable to use a heat transfer coil having closely spaced fins (such as 14 to the inch) to give a maximum heat transfer surface to cool the air at a maximum rate. However, when the air is cooled below its dew point and condenses moisture from the air, the condensed moisture in a coil with closely spaced fins will plug the coil and reduce the amount of air passing therethrough. This, in turn, reduces the capacity of the air conditioning system. Furthermore, the increased velocity of the air tends to tear the condensate from the fins and re-introduce the moisture into the air stream which may be delivered into the enclosure in the form of small droplets of water. On the other hand, if a coil with wider spaced fins (such as 6 to the inch) is used, it will eliminate the plugging of the coil with condensate, but reduces the rate of heat transfer. It is the usual practice in designing an air conditioning system to specify heat exchange coils for a particular installation with a fin spacing to give the best average result for both sensible and latent heat removal in a particular installation. However, at certain times, such a coil will not remove sensible heat at a maximum possible rate and at other times, will cause partial plugging of the coil with condensate on high humidity days. Also, in accordance with conventional design practice, a heat exchange coil is usually specified of a depth to produce only a small rise in the temperature of the heat exchange medium.

Dual duct systems are many times used for air conditioning large buildings which comprise a single inlet duct and a plurality of outlet ducts. A cooling coil is provided in one of the outlet ducts for supplying cool air and a heating coil is provided in the other duct for supplying warm air. Air is delivered from one or the other of the cold and warm air ducts to mixing boxes and then to outlet diffusers in the particular areas to be heated or cooled and the air supplied to the mixing boxes from the separate ducts is controlled by suitable control means. The heating medium supplied to the heating coil is usually steam or hot water from a boiler or other heat source and comprises an additional heating load on the system when the overall system may require cooling and especially when dehumidification and reheat constitute the major load.

One of the objects of the present invention is to provide an improved air conditioning system for both heating and cooling with heat exchange coils which produce a maximum sensible heat cooling down to the dew point temperature and latent heat cooling without plugging the coils with condensate.

Another object is to provide an air conditioning system for both heating and cooling which is adapted to cool air through a suitable wide temperature range while at the same time reducing the volume of water passed through the coil.

Another object is to exchange heat between the air and chilled water over a wide temperature range of the chilled water during cooling to improve the efficiency of the refrigeration system and produce the same cooling with less power imput while substantially reducing the size of the pump and lines of the fluid distribution system.

Another object is to provide a system of the type indicated which utilizes the heat from the condenser of the refrigeration system for reheating on days of high relative humidity to eliminate any additional load on the refrigeration system and decrease the load on the cooling tower at the time when its performance is the worst.

Another object is to provide a dual duct air conditioning system in which the coils in the outlet ducts can be used jointly for heating or cooling during peak load conditions.

Another object is to provide a three pipe liquid distributing system in a dual duct air conditioner which utilizes the heat absorbed in certain areas requiring cooling to heat the air in other areas requiring heating.

Still another object is to provide an air conditioning system of the type indicated which is of simple and compact construction, economical to manufacture and install and one which is flexible and reliable in operation to meet the varying load conditions with a minimum cost of operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 2 is an enlarged plan view of one of the air treating units applied to a dual duct type of air distributing apparatus and showing the progressively wider spacing of the heat transfer fins on the finned coil sections successively contacted by a stream of air to be cooled;

FIGURE 3 is an enlarged plan view of an air treating unit similar to FIGURE 2 and showing the successive coil sections connected to be controlled in a different way to better control dewpoint, reheat and especially partial load operation;

FIGURE 4 is an enlarged plan view of another form of air treating unit having separate ducts for separate areas where reheat is required and showing the circuit arrangement for the heat exchange fluid through successive coil sections; and FIGURE 5 is an enlarged sectional view of the damper operating means illustrated in FIGURE 2.

Figure 1:
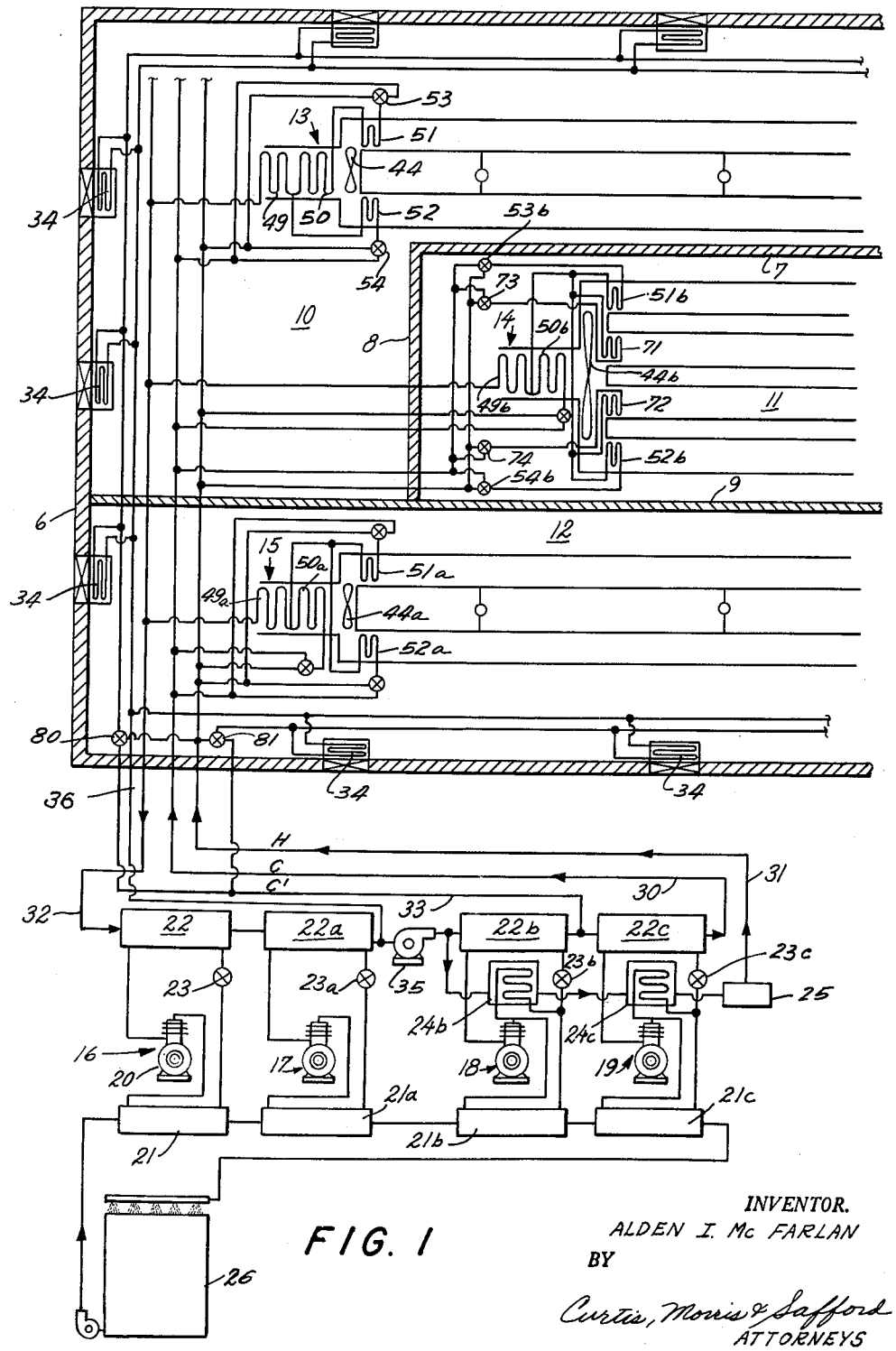
FIGURE 1 is a diagrammatic view showing the improved air conditioning system of the present invention applied to a building having separate areas with different air conditioning requirements.

In the drawings, the invention is shown applied to a building having different areas with different air conditioning requirements and air treating units for each of the areas of the dual duct type. One of the features of improvements in the air conditioning system of the present invention includes the provision of heat transfer coils having heat transfer fins on successive coil sections spaced progressively wider in the direction of air flow to produce a maximum heat transfer of sensible heat down to the dew point temperature of the air and subsequent latent heat removal without plugging the coils with condensate or the re-entry of condensate into the air stream. For purposes of illustration, separate finned coil sections are shown mounted in the inlet duct and each outlet duct of the dual duct system, respectively. Thus, a stream of air to be conditioned comprising either all outside air, all recirculated air, or a mixture of outside and recirculated air contacts the successive sections of the coil having progressively wider fin spacing. During a cooling cycle, chilled water is directed through the coil sections countercurrent to the direction of air flow which is progressively heated by heat exchange with the air stream so that the successive sections contacted by the air are at progressively lower temperature corresponding to the progressively wider spacing of the heat transfer fins.

Each of the coils in the outlet ducts is supplied with heat exchange fluid from a closed three pipe liquid distributing system described and claimed in my U.S. Patent 2,796,740, issued June 25, 1957. The three pipe liquid distributing system has a branch for supplying chilled water to each air treating unit, a branch for supplying hot water to each of the units and a common return from all the units. The separate heating and cooling branches of the three pipe system are connected in heat exchange relation with the condensers and evaporators of a multi-stage refrigeration system to progressively heat and cool the heat exchange medium to provide the temperature differential required. Thus, the system utilizes heat picked up on one section of the building for delivery to other sections of the building requiring heating. In accordance with another feature of the invention, each coil in the outlet ducts may be supplied with a heating or cooling fluid from the three pipe liquid distributing system so that both coils may be used jointly for heating or cooling at peak load conditions, or may be used for separate heating or cooling requirements in different areas of the building, or may be used for dehumidifying and reheating air when required.

Furthermore, the arrangement of the heat transfer coils in separate sections successively contacting the stream of air to be conditioned adapts the stream of air to be conditioned to be heated or cooled through a desired temperature range by heat exchange with water which is heated or cooled through a wide temperature range of, for example, 20° F. or more. Thus, a lesser quantity of heat transfer medium is required so that the liquid distributing system may have lines of smaller size, a pump or pumps of smaller capacity and smaller control valves to produce the air conditioning requirements. Still further, the heat exchange medium may be cooled at a higher temperature range in the first stage of a multi-stage refrigeration system which permits more heat to be removed at a higher temperature, thus reducing the compressor displacement and power required for each ton of refrigeration than in the air conditioning systems heretofore used.

FIGURE 1 of the drawings shows the air conditioning system of the present invention applied to a building 6 having partition walls 7, 8 and 9 dividing the space into separate areas 10, 11 and 12 having different air conditioning requirements. Each area 10, 11 and 12 has a separate air treating unit 13, 14 and 15, respectively, for delivering conditioned air to its individual dual duct air distributing system. For example, the outside area 10 at the north and west sides of the building may comprise general office space; the outside area 12 at the south side of the building may comprise a metallurgical laboratory where small furnaces are operated to heat metal; and the internal area 11 may contain a cafeteria and auditorium for conferences, storage space and utility machines and controls. The outside areas 10 and 12 require heating in summer and cooling in winter except that at certain times the area 12 may produce more heat than it loses and even require cooling in the winter. The interior area 11 will require cooling the year around but varying from time to time. It will be understood that the different areas may have different arrangements and different air conditioning requirements and that the building may have a number of floors, each with a different layout and air conditioning requirement.

The air to be conditioned may be heated or cooled and/or dehumidified by any suitable heating and cooling system in accordance with certain aspects of the present invention. However, to obtain a high thermal efficiency in accordance with other aspects of the invention, the air is heated or cooled in each air treating unit 13, 14 and 15 by a three pipe fluid distributing system of the type described and claimed in my prior Patent 2,796,740, referred to above, for selectively supplying hot or chilled water to each of the air treating units.

The heat transfer medium is, in turn, heated and cooled by a staged refrigeration system comprising a plurality of refrigeration units. The heat transfer fluid may be glycol or other anti-freeze solution or water containing an anti-freeze agent and in either case will be hereinafter referred to as water. Each refrigeration unit may be of the compression, absorption or steam jet type or may be a compression type having a multiple cylinder compressor with each cylinder operating with an individual evaporator to produce staged cooling, or centrifugal compressors may be used. For purposes of illustration the separate refrigeration units 16, 17, 18 and 19 are each shown as comprising a compressor 20, a condenser 21, an evaporative chiller 22 and an expansion valve 23. At least two of the refrigeration units 18 and 19 also have an auxiliary condenser 24b and 24c. The evaporative chillers 22, 22a, 22b and 22c of the separate units 16, 17, 18 and 19 are connected in series for the flow of a stream of water therethrough and the water is chilled to progressively lower temperatures as it flows through the successive water chillers. For example, the water chiller 22 of refrigeration unit 20 may chill the water from 78° F. to 70° F.; the water chiller 22a may chill the water from 70° F. to 58° F.; the water chiller 22b of refrigeration unit 18 may chill the water from 58° F. to 52° F.; and the water chiller 22c of refrigeration unit 19 may chill the water from 52° F. to 47° F. Between the water chiller 22a of unit 17 and 22b of unit 18, the stream of water is divided with a branch connected for flow through the auxiliary condensers 24b and 24c in series. A converter 25 is provided at the outlet from the auxiliary condenser 24c to supply any additional heat which may be required by the system.

The main condensers 21, 21a, 21b and 21c of the refrigeration units 16, 17, 18 and 19 also are connected in series in an open water circuit including a cooling tower 26 to remove heat from the condensers. The outlet from cooling tower 26 may connect the condensers 21, 21a, 21b and 21c either in series or in parallel and in the illustrated embodiment they are shown connected in series with the coldest water supplied to the unit 16 having the evaporator-chiller operating at the highest temperature. Thus, the refrigeration unit 16 has the highest evaporator temperature and the lowest condenser temperature to produce the most refrigeration with the least horsepower per ton. For example, with a condensing temperature of 100° F. and an evaporator temperature of 60° F. the refrigeration unit 16 requires only .5 horsepower per ton of refrigeration produced. The unit 17 having a condensing temperature of 102° F. and evaporator temperature of 48° F. requires .6 horsepower per ton of refrigeration. The unit 18 having a condensing temperature of 104° F. and evaporator temperature of 42° F. requires .80 horsepower per ton of refrigeration and the last stage unit 19 having a condenser temperature of 106° F. and an evaporator temperature of 37° F. requires 1.0 horsepower for each ton of refrigeration produced.

The closed three pipe fluid distributing circuit for the heat transfer fluid comprises a chilled water branch 30 connected to the outlet from the water chiller 22c of the last stage refrigeration unit 19, a hot water branch 31 connected to the outlet from the auxiliary condenser 24c of the last stage refrigeration unit 19, and a common return line 32 connected to the inlet end of the evaporative chiller 22 of the first stage refrigeration unit 16. The chilled water branch 30 is connected to supply chilled water and the hot water branch 31 is connected to supply hot water to each of the air treating units 13, 14 and 15. In addition, a second chilled water branch 33 is connected between the evaporative chillers 22b and 22c of the refrigeration units 18 and 19 to supply chilled water at a higher temperature to each of a plurality of air treating window units 34. The window units 34 may be of the fan coil type or air induction type and have a common return line 36. The common return line 32 is connected to all of the air treating units 13, 14 and 15 to deliver water to the inlet of the water chiller 22 of the first stage refrigeration unit 16, and common return line 36 is connected to the outlet end of all of the window units 34 and the chilled water circuit between the water chillers 22a and 22b. The water is circulated through all of the branches 30, 31, 33 and a common return line 32 and 36 of the closed fluid distributing circuit by a single pump 35 positioned between the evaporative chillers 22a and 22b of the second and third stage refrigeration units 17 and 18 with the rate of flow through the separate branches depending upon the requirements for chilled and hot water in the air treating units 13, 14 and 15.

In accordance with the present invention each of the air treating units 13, 14 and 15 has a heat transfer coil of successive sections with heat transfer fins of progressively wider spacing on the sections in the direction of air flow. In addition, the coil sections are so arranged and of such depth as to heat or cool the air to be conditioned to the desired temperature and to heat the water when cooling through a wide temperature range of the order of 20° F. to 35° F. The invention also includes an arrangement of the coil sections in a dual duct type air conditioner which permits both ducts to supply cooled or hot air for meeting peak conditions, or to dehumidify and reheat air for high humidity conditions with or without cooling as well as providing a supply of cooled air for the areas requiring cooling and hot air in areas requiring heating. The invention further includes a so-called heat pump cycle in which the evaporator and condenser of a refrigeration system are used to cool and heat streams of water for cooling and heating air in the separate ducts of a dual duct system. Each of the air treating units 13, 14 and 15 include the improved sectional coil arrangement of the present invention, but are connected to each other in different ways for the particular air conditioning requirements.

The air treating unit 13 illustrated in detail in FIGURE 2 is particularly adapted for conditioning a mixture of outside air and return air during both summer and winter operation. Suitable dampers, not shown, are provided for controlling the ratio of outside and recirculated air. The air treating unit 13 comprises a header 40 having an inlet duct 41 at one side and a pair of outlet ducts 42 and 43 at its other side. A fan 44 in the header 40 draws air through the inlet duct 41 and delivers it through the outlet ducts 42 and 43. A plurality of mixing boxes 45 are connected between the outlet ducts 42 and 43 by conduits 46 and 47 with each having air diffusing outlets 45a, for example, one for each room or section of an area. Each mixing box 45 delivers air to a plurality of rooms of sections of an area from either one or the other of the outlet ducts 42 and 43 in accordance with requirements as controlled by a thermostat and dampers 57 and 58 in the conduits 46 and 47. Thus, cool air may be supplied to all of the mixing boxes 45 from the duct 42, or hot air may be supplied to all of the mixing boxes from the duct 43, or a mixture of cooled and heated air may be supplied to the mixing boxes from ducts 42 and 43.

A finned heat transfer coil 48 having separate sections 49 and 50 is provided in the inlet duct 41 of the air treating unit 13 and finned heat transfer coil sections 51 and 52 are provided in each of the outlet ducts 42 and 43, respectively. The ends of the finned coil sections 51 and 52 last contacted by the air are each connected to the chill water branch 30 and hot water branch 31, respectively, through valves 53 and 54 for controlling the supply of chilled and hot water to the coil section for flow therethrough. The opposite end of the finned coil section 51 first contacted by the stream of air to be conditioned is connected by a line 55 to the end of the coil section 50 last contacted by the air. The end of the coil 52 first contacted by the stream of air to be conditioned is connected by a line 56 to the junction between two sections 49 and 50 of coil 48. Thus, all heat transfer fluid supplied to either finned coil section 51 and 52 flows through successive sections of finned coil 48 in a direction countercurrent to the direction of air flow. The coil section 49 first contacted by the air is so designed as to cool air to its dew point and the successive section 50 is designed to cool the air below its dew point to dehumidify the air to a predetermined relative humidity by removing moisture therefrom. The coil section 51 in the cold duct 42 is adapted to further cool the air below its dew point and remove additional moisture and coil section 52 in hot duct 43 is adapted to heat the dehumidified air.

The successive finned coil sections 49, 50 and 51 and 52 have the heat transfer fins F spaced progressively wider in the direction of air flow to produce maximum sensible heat cooling and heating and latent heat cooling and moisture removal without plugging the coils. For example, the coil section 49 first contacted by the stream of air may have a close fin spacing of 14 fins to the inch to produce maximum sensible heat transfer, the section 50 having a wider fin spacing of 10 fins to the inch and the coil sections 51 having a still wider fin spacing of 6 fins to the inch. Coil 52 has a fin spacing depending upon its major function. As the coil 52 is generally used for additional heating on peak loads and reheating for dehumidification loads, it usually has closely spaced fins for high heat transfer. Thus, the stream of air may be progressively cooled and dehumidified without any excessive rise in the pressure drop in any particular coil section to maintain the volume of air treated substantially constant for any operating condition. For example, during a normal cooling operation, treating unit 13 receives a mixture of outside air and recirculated air at 84° F. D.B. and 72° F. W.B. As the air flows through the section 49 of the finned coil 48 it is cooled down to 70° F., or 3° above its dew point temperature of 67° F., with a maximum heat transfer rate on a dry coil without condensing any moisture from the air at design load. The stream of air then passes through the section 50 of coil 48 where it is cooled from 70° F. to 59° F. with removal of moisture therefrom by direct contact of the air with fin surfaces at a temperature below the dew point. The air is then further cooled from 59° F. to 55° F. and further dehumidified as it passes through the cooling coil 51 to the cold air duct 42. The chilled water may enter the coil 51 at a temperature of 47° F. and leaves the coil at about 51° F. where it enters the coil section 50. As the chilled water passes through the coil section 50 its temperature is increased to some temperature between 58° F. and 68° F. depending upon the load condition. As the water passes through the section 49 of coil 48 its temperature is increased from 70° F. to 76° F. Thus, the air being conditioned is cooled from 84° F. to 55° F. or through a temperature range of 29° F. and the cooling medium is heated from 47° F. to 74° F. or through a temperature range of 27° F.

The flow rate of chilled water to finned coil section 51 is controlled by valve 53 to maintain the air coming off coil section 50 at a desired dew point temperature of, for example, 59° F., to produce comfort conditions. To this end, a thermostat having a bulb $T_1$ senses the temperature of the air coming off the coil section 50 and is connected to operate the valve 53 to maintain the desired dew point temperature of 59° F. A second thermostat having a bulb $T_2$ senses the temperature of the air coming off coil section 51 and also is connected to valve 53. Bulb $T_2$ of the second thermostat overrides $T_1$ of the first thermostat to supply chilled water to coil section 51 at a rate to maintain an air temperature in cold duct 42 of 55° F. when required to obtain further sensible cooling. Thus, when the temperature of the air in the duct 42 tends to rise above 55° F. and the room sensible cooling is not satsified, the valve 53 opens to supply more chilled water to coil section 51 and as the temperature tends to fall below 55° F., the valve closes to stop the flow to maintain the air at a substantially constant temperature of 55° F. Valve 54 is adapted to supply chilled water to reduce the temperature of air in duct 43 to a temperature somewhat higher than 55° F., for example, 58° F. controlled by thermostat $T_3$.

The flow of hot water to the finned coil section 52 and the amount of hot water supplied is also controlled by valve 54 operated by thermostat bulb $T_3$ responsive to the temperature of the air in the outlet conduit 43 and connected to operate the valve. When the temperature of the air in the duct 43 tends to rise above that at which the thermostat is set, the valve closes to stop the flow of hot water and as the temperature tends to fall below the set temperature, the valve opens to increase the flow to maintain the temperature of the air in duct 43 at the temperature required to satisfy the room thermostat. For some installations, no hot water would be supplied to the coil section 52 during summer operation so that air would be supplied to duct 43 at the temperature it leaves coil section 50 and the chilled air at different temperatures would be supplied to mixing boxes 45 as required.

The dampers 57 and 58 in the conduits 46 and 47 are each individually operated by a pneumatic motor 59 and 60, respectively, see FIGURES 2 and 5. Each motor comprises a cylinder 61 housing a piston therein for moving a rack 62 in opposite direction. The dampers 57 and 58 are rotatable on shafts having a pinion 63 in mesh with the rack 62 of its particular motor 59 or 60. The supply of pneumatic fluid to both motors 59 and 60 is controlled by high temperature and low temperature selector relays 64 and 65. The motors 59 and 60 are so arranged that upon an increase in pressure, indicating a raise in temperature, the damper 58 from the hot duct 43 closes and the damper 57 from the cold duct 42 opens. However, each damper 57 and 58 is adapted to swing beyond its fully open or fully closed position indicated by full lines and dotted lines in FIGURE 5, so that at extreme temperatures calling for heating or cooling, both dampers will be moved to a partially open position indicated by dash lines in FIGURE 5.

The high temperature and low temperature selector relays 64 and 65 are controlled by individual thermostats in the compartments or areas serviced by the different outlets 45a and having individual bulbs $T_4$, $T_5$, etc. The high temperature selector relay 64 is connected to the thermostat for valve 53 and when the bulbs $T_4$, $T_5$, are calling for heating in all of the compartments, the selector relay resets the thermostat to supply hot water to the cooling coil 51 to heat the air in duct 42. Similarly, the low temperature selector relay 65 is controlled by bulbs $T_4$ and $T_5$, etc., and, in turn, is connected to the thermostat for valve 54 and when all of the bulbs are calling for cooling, the selector relay resets the thermostat to supply chilled water to the heating coil 52.

When the temperature in all of the areas being conditioned is satisfactory, but the humidity is high, the thermostat having bulb $T_1$ maintains the air coming off coil section 50 at the required dew point of, for example, 59° F. to maintain the desired humidity in all areas. However, if the air from the coil section 50 is at too low a temperature for comfort conditions, part of the dehumidifier air is reheated by the coil section 52 in duct 43. Under these operating conditions, the selector relays 64 and 65 acting through pneumatic motors 59 and 60 will actuate dampers 57 and 58 to supply a mixture of cooled and reheated air in the proportions required to maintain comfort conditions in the areas being conditioned.

As stated above, when extreme temperature conditions exist, the pneumatic motors 59 and 60 will operate each damper 57 and 58 beyond its normal operating range to partially open both conduits 46 and 47, the high and low temperature selector relays 64 and 65 will reset the thermostat having bulb $T_2$ or $T_3$ to supply either hot water to coil 51 or chilled water to coil 52 to heat or cool air in both ducts 42 and 43 which flows from ducts through the partially open dampers to the mixing boxes 45.

When the load is a heating load in winter, but a controlled maximum dew point is required for internal areas, the thermostat bulb $T_1$ controls valve 53 to maintain the air leaving coil 50 at the required dew point temperature and the air is then heated by coil 52 in duct 43. Usually under these operating conditions, the temperature of the air leaving coil 50 will satisfy thermostat bulb $T_1$ without any cooling so that cooling coil 51 is not operated and coil section 49 operates as a preheating coil. Under more extreme conditions when coil 51 shifts to a heating coil, both coil sections 49 and 50 operate as heating coils. Coil 51 also could be controlled by bulb in inlet duct 41 and connected to reset temperature at which $T_1$ operates valve 53.

The air being conditioned is cooled through a wide temperature range as it flows through successive coil sections 49, 50 and 51. Conversely, the chill water is heated through a wide temperature range as it flows through the coil sections 51, 50 and 49 in a direction countercurrent to the direction of air flow. As stated above, the outside air may be cooled from 84° F. to 55° F. and the chill water heated from 47° F. to 76° F. As a result, the water distribution system requires only one-third to one-fourth as much water as conventional systems so that it can be reduced in size with a smaller pump for supplying less water with smaller pipe lines and control valves than conventional systems. Also, the higher water temperature permits heat to be removed at a higher temperature in the staged refrigeration units which reduces the compressor displacement and power required for each ton of refrigeration produced. Furthermore, the only heat supplied to the system for re-heating dehumidified air is heat removed from the building which reduces the load on the cooling tower 26 at the time when the humidity is high and its cooling capacity the lowest.

The air treating unit 15 illustrated in FIGURE 3 of the drawings is generally similar to that illustrated in FIGURE 2, but is adapted to condition 100% outside air and the entire coil 48a is adapted to operate as a heating coil or as a cooling coil. The air treating unit 15 has a header 40a with an air inlet duct 41a at one side and a pair of outlet ducts 42a and 43a the same as the air treating unit 13 illustrated in FIGURE 2. The air treating unit 15 also includes a fan 44a in the header 40a, a coil 48a having sections 49a and 50a in the inlet duct and coil sections 51a and 52a in the outlet ducts 42a and 42b. Also, the fins F have a progressively wider spacing in successive coil sections 49a, 50a and 51a, the same as in FIGURE 2. The coil sections 51a and 52a are each connected to the branches 30 and 31 of the fluid distribution circuit in the same manner as the air treating unit 13. However, the outlet from the coil sections 51a and 52a are connected to each other and to the coil 48a between the sections 49a and 50a so that a larger supply of chilled water flows through the section 49a to produce a greater sensible heat transfer. The end of the coil section 50a last contacted by the stream of air being conditioned is supplied with chilled or hot water from the lines 30 and 31 through a valve 66 controlled by the thermostat having bulb $T_1$ to maintain the air supplied to the ducts 42a and 43a at the required dew point temperature for comfort conditions, the same as in unit 13 in FIGURE 2. Selector relays 64 and 65 control pneumatic motors 59 and 60 and dampers 57 and 58 the same as the unit 13 in FIGURE 2 and resets thermostats having bulbs $T_2$ and $T_3$ to cause both coils 51a and 52a to either cool or heat at peak load conditions.

In the unit 15, an additional thermostat is provided having a bulb $T_{1a}$ between coil sections 49a and 50a. If the temperature of the air leaving the section 49a of coil 48a is at or below the required dew point temperature of, for example, 59° F. the additional thermostat having bulb $T_{1a}$ resets thermostat $T_1$ to a temperature of, for example, 65° F. to cause it to actuate valve 66 and supply hot water to coil section 50a.

With the arrangement of coil sections 49a, 50a, 51a and 52a, the controls illustrated will operate in substantially the same way as unit 13 during the summer to cool the air, but during winter operation they will operate the coil sections 49a and 50a to heat the outside air. For example, outside air at 0° F. is sensed by bulb $T_{1a}$ and resets thermostat having bulb $T_1$ to supply hot water to coil section 50a to heat instead of cool the air. The supply of hot water to coil section 50a will continue so long as the temperature of the air sensed by bulb $T_{1a}$ is below 59° F. The water leaving coil sections 51a and 52a is mixed and delivered between coil sections 49a and 50a for flow through section 49a which further preheats the incoming outside air.

The air treating unit 14 illustrated in FIGURE 4 has an air inlet duct 41b with a coil 48b with coil sections 49b and 50b the same as units 13 and 15. However, unit 14 has individual outlet ducts for supplying conditioned air directly to individual areas without any mixing between hot and cold air ducts. In addition to the individual ducts 42b and 43b, the unit has ducts 69 and 70 with coil sections 71 and 72. The coil sections 51b, 52b, 71 and 72 are principally used as reheat coils, but may operate as cooling coils when required to meet the individual needs of the area to which they supply air.

It will be understood that a static pressure regulator would be required in some installations. Such regulators are of a known construction for controlling the flow of air to be conditioned to maintain a desired pressure in the ducts 42 and 43. For the purpose of simplifying the disclosure, such pressure regulators have not been illustrated but would comprise pivoted vanes, either on the suction or discharge side of the fan 44b and operated by a motor responsive to the static pressure to be controlled. One form of the air conditioning system incorporating the novel features of the present invention having now been described in detail, the mode of operation of the air conditioning system is next explained.

The single pump 35 circulates water through the evaporative chillers 22, 22a, 22b and 22c of successive refrigeration units 16 to 19 and auxiliary condensers 24b and 24c of units 18 and 19 to supply chilled water and hot water to branches 30 and 31 of the closed circuit for heat transfer fluid. The evaporative chillers 22, 22a, 22b and 22c chill water in successive stages from a temperature of, for example, 78° F. to 47° F. and the auxiliary condensers 24b and 24c heat water to a temperature as needed with a maximum of about 95° F. boosted further by converter 25 if necessary. During normal operation of the system, a stream of air to be conditioned is circulated through each air treating unit 13, 14 and 15 by its fan 44 and successively contacts the finned coil sections 49, 50 and 51 and 52. Simultaneously, chilled water is supplied to the cooling coil section 51 and hot water is supplied to the heating coil section 52 of each air treating unit 13, 14 and 15 and flows through the coil sections 51 and 52 and coil sections 50 and 49 in a direction countercurrent to the direction of air flow. Thus, the temperature of the air and water are changed in a reverse order. When the load in any particular area is a heating load, air is supplied from the hot air duct 43 to the mixing box 45 and when the load is a cooling load air is supplied from the cold air duct to the mixing box 45, or both hot and cold air may be supplied as controlled by the dampers 57 and 58. Heat exchange fluid will flow through the coil sections 51 and 52 as controlled by the thermostat bulbs $T_1$, $T_2$, $T_3$, $T_4$, etc. to provide air at the required dew point and temperature to the various areas to be conditioned. It will be noted that under these conditions of operation, the air passing the coil section 51 will heat the water delivered to coil section 50 and the air passing through coil section 52 will cool the water delivered to coil section 49. It will also be observed that the heat picked up in the cooling coil section 51 is delivered to the coil 48 and mixed with the water from the heating coil 52 tending to balance out the heating and cooling load in the different sections of the area being serviced by its particular air treating unit.

During winter months, both coils 51 and 52 may be supplied with hot water and during summer months both coils may be supplied with chilled water. However, the load in areas 11 and 12 may be a cooling load when the load in area 10 is a heating load so that the two loads are balanced in the three pipe fluid distributing system. This results from the delivery of water from all of the air treating units 13, 14 and 15 to the common return line 32 connected through the evaporative chiller 22 of the refrigeration units 16 to 19 to the branches 30 and 31 to complete the circuit. Furthermore, heat picked up in one area of the building is used in the condensers 24b and 24c to heat the water supplied to other areas requiring heating so that no additional heating load is applied to the system especially when cooling and reheat are required for dehumidification. When the refrigeration load decreases the refrigeration units 16 to 19 drop out of operation successively, and if the heating load increases beyond the capacity of the auxiliary condensers 24b and 24c, the converter 25 adds additional heat to the water in hot water branch 31. The branch line 33 supplies chilled water to the window units 34 as required when cooling and the hot water lines supply hot water to the window units when heating is required. The flow of chilled or hot water to the window units is controlled by valves 80 and 81 similar to the valves 53 and 54.

When either the heating or cooling requirements in a particular space reach a peak condition the high and low temperature selector relays 64 and 65, as controlled by the plurality of thermostats $T_4$, $T_5$, etc., in the individual areas, reset the valves 53 and 54 to supply chilled water or hot water, as the case may be, to both coil sections 51 and 52. When the temperature in a particular area is satisfied, but the humidity is excessively high the thermostat having bulb $T_1$ operates valve 53 to supply chilled water to coil sections 51 and 50 to dehumidify the air to a desired dew point temperature. The cold dehumidified air then flows through the heating coil section 52 to reheat the dehumidified air for delivery to the mixing box 45.

During operation in the summer the coil sections 49, 50 and 51 are successively contacted by the stream of air to progressively cool the air through a wide temperature range and dehumidify the air without plugging the coils with condensate. The first coil section 49 has closely spaced fins (14 to the inch) to transfer sensible heat at a maximum rate as the coil and fins F remain dry. The next coil section 50 has wider spaced fins (10 to the inch) to produce both sensible and latent heat cooling, but providing a larger space for the flow of air. The last coil section 51 produces mostly latent heat cooling, but the wider spacing of the fins compensates for additional condensate produced.

The arrangement of the successive coil sections 49, 50 and 51 and 52 also produces cooling of the air and heating of the water through a wide temperature range which reduces the quantity of water required to heat or cool the air. This results in smaller pumps and fans and power required as well as reducing the size of the conduits and pipe lines. The wide range cooling and the staged refrigeration units also improve the efficiency of the refrigeration system and reduce power required per ton of refrigeration produced.

As the mixed water passes through the evaporator chillers 22, 22a, 22b and 22c of the refrigeration units 16 to 19, it is cooled as required by removing heat therefrom. Excess heat is dissipated to the atmosphere through the cooling tower 26. Heat required for air conditioning is obtained from the auxiliary condensers 24b and 24c so that the same heat removed in certain areas of the building is used to heat other areas of the building. As the heating and cooling loads in many modern buildings are approximately equal during many months of the year, no additional artificial load is supplied to the enclosure. When additional heat is required it is supplied by the converter 25.

The main condensers 21, 21a, 21b and 21c of the staged refrigeration units 16, 17, 18 and 19 are successively cooled by water circulated in the circuit including the cooling tower 26 to dissipate the heat removed by the evaporator chiller 22 that is not utilized for heating water in the hot water line. It will be noted that the coldest water in the cooling tower circuit is delivered to the condenser 21 of the first stage refrigeration unit 16 so that this unit operates through the smallest temperature and pressure difference to refrigerate at a maximum rate with the lowest power input with successive units 17, 18 and 19 gradually increasing in the difference in temperature and pressure.

It will now be observed that the present invention provides an improved air conditioning system for both heating and/or cooling an enclosure having heat exchange coils which produce a maximum sensible heat cooling down to the dew point temperature and latent heat cooling below the dew point temperature without plugging the coils with condensate. It also will be observed that the present invention provides an air conditioning system which changes the temperature of the water through a wide temperature range to reduce the volume of water required. It will further be observed that the present invention improves the efficiency of the refrigeration system to produce cooling with a minimum power input per ton of refrigeration produced and substantially reducing the size of pumps and lines of the liquid distributing system over the size of pumps and lines in conventional systems. It will further be observed that the present invention utilizes the heat from the condensers of the refrigeration units for reheating air dehumidified by cooling which reduces the load on the cooling tower. It will further be observed that the present invention provides a dual duct air conditioning system in which both ducts may be used jointly for heating or for cooling at peak load conditions with less air circulation or for dehumidifying and reheating air when the humidity is high. It will still further be observed that the present invention provides an air conditioning system which is of simple and compact construction, economical to manufacture and install and one which is reliable in operation and flexible to meet all air conditioning requirements.

While a single embodiment of the invention is herein illustrated and described, it will be understood that changes may be made in the construction and arrangement of elements without departing from the spirit or scope of the invention. For example, the terms "heat exchange medium" and "water" as used in the specification and claims are intended to include water, anti-freeze materials fluids, such as ethylene glycol or a combination of both. Also, the term "coil section" is intended to include separate coils or a continuous coil having successive tubes or rows of tubes contacted by the air being conditioned. Therefore, without limitation in this respect, the invention is defined by the following claims.

I claim:

1. In an air conditioning system, the combination of, an air treating unit having successive finned coil sections, a fan for directing a stream of air through the air treating unit to cause the finned coil sections to be successively contacted by the air to be conditioned, lines connecting said coil sections to form a circuit for water, said circuit directing water through the coil sections in a direction countercurrent to the direction of flow of the air stream, said circuit having a first branch with heating means connected to supply hot water to the air treating unit, a second branch with cooling means connected to supply chilled water to the air treating unit and a common return line, a circulator for circulating the water through both branches to said circuit, valve means for controlling the flow of hot and chilled water through the air treating unit, and the successive coil sections of the air treating unit having fins of progressively wider spacing in the direction of air flow.

2. In an air conditioning system, the combination of, an air treating unit having separate finned coil sections, a fan for directing a stream of air through the air treating unit to cause the finned coil sections to be successively contacted by the air to be conditioned, lines connecting said coil sections to form a circuit for directing a heat exchange fluid through the sections in a direction countercurrent to the direction of air flow, said circuit having a first branch connected to supply heating fluid to the air treating unit, a second branch connected to supply cooling fluid to the air treating unit and a common return line for both heating and cooling fluid, a circulator for circulating heat exchange fluid through both branches of said circuit, a refrigeration system having a heat dissipating element in the first branch and a heat absorbing element in the second branch, and the successive coil sections of the air treating unit having fins of progressively wider spacing in the direction of air flow.

3. An air conditioning system of the dual duct type comprising an air inlet duct and a pair of outlet air ducts, separate finned coil sections in each of said air ducts, a fan for producing a flow of air through said ducts to contact the finned coils successively, means for circulating a heat exchange medium through each of the finned coils in a direction countercurrent to the direction of air flow, the fins on the coil first contacted by air in the inlet duct being closely spaced to produce a maximum heat transfer and the fins of the coils in at least one of the pair of ducts last contacted by the air being more widely spaced than the fins in the inlet duct first contacted by the air.

4. An air conditioning system in accordance with claim 3 in which the finned coil in the inlet air duct has separate sections, and the fins on the successive sections having a progressively wider spacing in the direction of air flow.

5. An air conditioning system in accordance with claim 4 in which the fins on the successive sections of the coil in the inlet duct and at least one outlet duct have a progressively wider spacing in the direction of air flow.

6. An air conditioning system of the dual duct type comprising an air inlet duct and a pair of outlet air ducts, conduit means connected to the outlet ducts and having dampers for supplying air from each and both ducts to the enclosure to be conditioned, a fan for directing air through the inlet and outlet ducts, separate coil sections in each of the ducts, lines connecting said plurality of coil sections to form a closed fluid circuit for directing heat exchange fluid through the sections, said circuit having a first branch connected to supply a heating fluid to each coil section in the outlet ducts, a second branch connected to supply cooling fluid to each coil section in the outlet ducts and a common return line, and valve means for controlling the flow of either heating or cooling medium whereby each outlet duct is adapted to supply hot and cold air to the enclosure to be conditioned to meet peak load conditions.

7. An air conditioning system in accordance with claim 6 in which a thermostat responsive to the temperature of the air leaving the inlet duct is connected to control the valve means to supply cooling medium to the coil in the inlet duct to dehumidify the air, a thermostat responsive to a condition affected by the coil section in one of said ducts for controlling the valve means to said section to supply heating and cooling medium to the coil section, and said last named thermostat supplying a heating medium to the coil section in said one outlet duct to reheat air cooled and dehumidified by the coil section in the inlet air duct.

8. An air conditioning system in accordance with claim 6 in which the coils in the outlet ducts are connected to deliver heat transfer medium to the coil section in the inlet duct.

9. An air conditioning system in accordance with claim 6 in which the coil in the inlet duct has successive sections, the coil section in one of the outlet ducts is a cooling coil, the coil section in the other outlet duct is a heating coil, said cooling coil being connected to deliver heat exchange medium to the section of the coil in the inlet duct last contacted by the air, and the heating coil being connected to deliver heat exchange medium between the coil section in the inlet duct.

10. An air conditioning system in accordance with claim 6 in which the coil in the inlet duct has separate sections, the coil section in one of the outlet ducts is a cooling coil, the coil section in the other outlet duct is a heating coil, said branches of the fluid circuit being connected to deliver heat exchange medium to both the cooling coil and second section of the coil in the inlet duct, and both the heating and cooling coils being connected to deliver heat exchange medium between the coil sections in the inlet duct.

11. An air conditioning system of the dual duct type for air conditioning an enclosure comprising an air inlet duct and a plurality of air outlet ducts for delivering air to different areas of the enclosure, a coil section in the air inlet duct, a coil section in each of the outlet ducts, a closed fluid circuit having one branch for supplying cooling medium to each of the coil sections in the inlet and outlet ducts, a branch for supplying heating medium to each of the coil sections in the inlet and outlet ducts, a valve for controlling the supply of the heating and cooling medium to each coil section, a thermostat responsive to the temperature of air leaving the inlet duct for controlling the supply of heating and cooling medium to the coil section in the inlet duct, a thermostat for each of the other coil sections responsive to the temperature of the air in its respective outlet duct for controlling the supply of heat exchange medium thereto, and the coil sections in each of the outlet ducts being connected to supply heat exchange fluid to the coil section in the inlet duct.

12. An air conditioning system of the dual duct type comprising a heat exchange unit having an air inlet and a plurality of air outlet ducts, a chilled water circuit having a cooling coil in one of the outlet ducts to cool air flowing therethrough, a hot water circuit having a heating coil in the other outlet duct to heat air flowing therethrough, means for delivering cooled air and heated air from the respective ducts to different areas as required, a refrigeration system having at least one evaporator and a plurality of condensers, said evaporator being arranged in heat exchange relation to the chilled water circuit to cool the water therein, one of said plurality of condensers being arranged in heat exchange relation with the hot water circuit for heating the water therein, and cooling means in heat exchange relation with another of the plurality of condensers to remove heat from the refrigeration system.

13. An air conditioning system in accordance with claim 12 in which an additional coil is provided in the air inlet and connected to the hot and cold water circuits, valve means for controlling the flow of hot and cold water thereto, thermostatic means responsive to the temperature of the air in the air inlet for controlling the valve means to cool and heat air to a predetermined dew point temperature, and the cooling coil in one of the outlet ducts supplying cooled air when cooling is required and the heating coil in the other outlet duct reheating the dehumidified air when heating is required.

14. An air conditioning system in accordance with claim 12 in which the condensers are connected in parallel in the refrigeration circuit, and the cooling means in heat exchange with the other condenser is a cooling water circuit having a cooling tower therein.

15. An air conditioning system in accordance with claim 12 in which a plurality of dual duct heat exchange units are provided in different areas having different air conditioning requirements, and the plurality of units being connected in parallel in the hot and cool water circuits whereby the heat absorbed in certain areas is used to heat other areas.

16. In an air conditioning system, the combination of, a dual duct air distributor having an inlet duct, a plurality of outlet ducts and a fan for directing a stream of air through the inlet and outlet ducts, heat transfer means having coil sections in the inlet and outlet ducts and connected to direct a heat transfer medium through the coil sections in a direction countercurrent to the direction of air flow, a circuit for the heat transfer medium having a branch for delivering hot medium to the heat transfer means, a branch for delivering chilled medium to the heat transfer means, a single return line connecting the outlet from the heat transfer means to the separate branches to form a closed circuit and a pump for circulating heat transfer medium through the circuit, valves for controlling the delivery of hot and cold medium to the heat transfer means, and a staged refrigeration system of separate refrigeration circuits each having a water-chiller connected in series in the branch of the circuit for supplying chilled water to the heat transfer means and at least one condenser connected in the branch for supplying hot water to the heat transfer means.

17. An air conditioning system for a building having different areas with different heating and cooling requirements, an air treating unit in each of the different areas, each of said air treating units being of the dual duct type having an air inlet duct, a pair of air outlet ducts and a fan for blowing air through the inlet and outlet ducts, a coil in the inlet duct having separate sections contacted successively by the air stream, a coil in each of the outlet ducts, a fluid circuit connecting the coils in the outlet ducts in series with the coil section in the inlet duct of all of the air treating units and comprising a first branch for supplying a heating medium to the coils in the outlet ducts, a branch for supplying cooling medium to the coils in the outlet ducts and a common return to both branches, a pump for circulating heat exchange fluid through both branches of the circuit, and a staged refrigeration system having separate refrigeration circuits, each refrigeration circuit having a water-chiller and a condenser, the water-chillers of the refrigeration circuits being connected in series in the branch for supplying cooling medium, the condensers being connected in a cooling water circuit including a cooling tower, and an auxiliary condenser in at least one of the refrigeration circuits connected in the branch for supplying heating medium.

References Cited in the file of this patent

UNITED STATES PATENTS

| | | |
|---|---|---|
| 1,524,520 | Junkers | Jan. 27, 1925 |
| 1,863,578 | Morse | June 21, 1930 |
| 2,023,622 | Textorius | Dec. 10, 1935 |
| 2,613,065 | Didier | Oct. 7, 1952 |
| 2,641,111 | Bishop | June 9, 1953 |
| 2,796,743 | McFarlan | June 25, 1957 |
| 2,929,229 | Detwiler | Mar. 22, 1960 |